United States Patent [19]

Lodi et al.

[11] Patent Number: 4,787,499
[45] Date of Patent: Nov. 29, 1988

[54] DEVICE FOR OVERTURNING PACKS, PARTICULARLY CIGARETTE PACKS AND THE LIKE

[75] Inventors: Oliviero Lodi; Gianni Armaroli; Marco Cugolli, all of Bologna, Italy

[73] Assignee: Sasib S.p.A., Bologna, Italy

[21] Appl. No.: 940,253

[22] Filed: Dec. 10, 1986

[30] Foreign Application Priority Data

Dec. 18, 1985 [IT] Italy ............................. 12626 A/85

[51] Int. Cl.$^4$ .............................................. B65G 47/24
[52] U.S. Cl. .................................... 198/407; 198/409
[58] Field of Search .............. 198/406, 407, 409, 403, 198/400, 402, 468.8, 416; 414/413, 418, 758, 768, 769, 773, 76, 80, 81, 31, 55

[56] References Cited

U.S. PATENT DOCUMENTS

| | | | |
|---|---|---|---|
| 2,461,290 | 2/1949 | Maynard et al. | 198/406 X |
| 2,734,213 | 2/1956 | Ashford | 198/402 X |
| 2,821,314 | 1/1958 | Gibbons et al. | 414/418 |
| 2,918,162 | 12/1959 | Ervin | 198/416 |
| 3,311,215 | 3/1967 | Clark et al. | 198/468.8 X |
| 3,656,605 | 4/1972 | Gess | 198/406 X |
| 3,687,263 | 8/1972 | Randrup | 198/400 X |
| 3,876,064 | 4/1975 | Morton | 198/400 X |
| 3,998,320 | 12/1976 | Eggert | 198/406 X |
| 4,213,526 | 7/1980 | Graham et al. | 198/407 X |
| 4,220,238 | 9/1980 | Shavit | 198/400 |
| 4,257,516 | 3/1981 | Ionescu | 198/407 X |
| 4,668,149 | 5/1987 | Sloan | 198/468.8 X |

Primary Examiner—Robert J. Spar
Assistant Examiner—Cheryl L. Gastineau
Attorney, Agent, or Firm—Spencer & Frank

[57] ABSTRACT

The present invention is a device for overturning cigarette packs or the like, which are advanced in a horizontal row toward an abutment stop member and must be each capsized around an axis which is transverse to the direction of progress of the row of packs. The device according to the invention is characterized by a pack-guiding arcuate channel extending in a substantially vertical plane at about 180°, from a substantially horizontal top opening provided before the abutment stop member and having a width which is at least slightly greater than the extension of a pack in the direction of progress of the pack row, as far as an underlying conveyor for the capsized packs. The pack-guiding arcuate channel has its extrados convex side turned toward the direction of arrival of the pack row, while in correspondence of the opening thereof, supporting teeth that can be elastically opened out are provided, and are adapted for each time supporting the leading pack in the row of packs and for letting it through as a result of a thrust exerted thereon from above by a pusher. Thus, the pack P is dropped into the opening of the pack-guiding arcuate channel and runs along this channel by gravity, with its side that in the overlying row of packs was turned backward, being turned forward, so that it is capsized during its travel along the said arcuate channel.

8 Claims, 3 Drawing Sheets

DEVICE FOR OVERTURNING PACKS, PARTICULARLY CIGARETTE PACKS AND THE LIKE

BACKGROUND OF THE INVENTION

1. Field of the Invention

The present invention is a device for over-turning packs, particularly cigarette packs, or the like, which are advanced in a substantially horizontal row toward an abutment stop member and must be each capsized around an axis which is transverse to the direction of progress of the pack row, so as to turn upward their originally downwardly turned face.

2. Discussion of the Prior Art

The known overturning devices of this type permit attainment of operative speeds up to a certain limit. This limit is inadequate for the present output rates on the order of 350–400 packs per minute. In fact, at such high rates, in the known overturning devices a jamming of the packs may occur, which is due to a small irregularity in the positioning of the leading pack in the pack row, with respect to the abutment stop member.

SUMMARY OF THE INVENTION

The present object of the invention is to provide a pack-overturning device of the above disclosed type, that can be operated without any trouble at a higher speed than the up to now attainable speeds, and that puts up with any inexactness, even to a sensible degree, in the positioning of the leading pack in the pack row with respect to the abutment stop member, while its construction is very simple and economical.

The prior art problems are solved by the invention of a pack-overturning device of the type as described at the beginning, which is substantially characterized by a pack-guiding arcuate channel extending in a substantially vertical plane at about 180°, from a substantially horizontal top opening provided before the abutment stop member and having a width which is at least slightly greater than the extension of a pack in the direction of progress of the pack row, as far as an underlying conveyor for the capsized packs. The pack-guiding arcuate channel has its extrados convex side turned toward the direction of arrival of the pack row, while corresponding to its opening, means are provided which are adapted for each time supporting in a substantially horizontal position the leading pack in the pack row and for letting it through upon control, so as to cause it to drop into the opening of the pack-guiding channel.

In the overturning device according to the invention, the leading pack in a pack row which is advanced in a substantially horizontal direction toward an abutment stop member, is dropped in a substantially horizontal position, into the opening of a pack-guiding arcuate channel having it extrados convex side turned toward the direction of arrival of the packs, and extending in a substantially vertical plane at about 180°, as far as an underlying substantially horizontal pack conveyor. Thus, the pack which is dropped into the pack-guiding arcuate channel runs along this channel by gravity, and its side that was turned backward with respect to the direction of progress of the pack row toward the abutment stop member, is turned forward, so that this pack is capsized in the course of its travel along the pack-guiding arcuate channel, and at the end of the same, i.e., on the lower conveyor, its originally downardly turned face is turned upward. The simple construction and hence the economical character of the device according to the invention are evident. Moreover, since the width of the pack-guiding arcuate channel in the direction of progress of the pack row toward the abutment stop member can be selected even greater than the corresponding size of a pack, the overturning device according to the invention operates in a reliable manner also in the case of appreciable errors in the positioning of the leading pack in the pack row with respect to the abutment stop member, so that the leading pack in the pack row regularly runs into the pack-guiding channel in a position more or less apart from the abutment stop member.

Preferably, the leading pack in the pack row is supported over the opening of the pack-guiding arcuate channel only at the edges of at least two opposite sides thereof, by means of supporting elements that can be elastically opened out, and that are, for example, deformable and/or shiftable, which are adapted for letting through a pack under the action of a thrust being exerted from above on the pack by a pusher. In this instance, according to a further feature of the invention, the pusher acts upon the pack, for example in an eccentric zone and/or in an inclined direction, in such a manner that already at the time of its passage between the supporting elements that can be elastically opened out, this pack is caused to assume a certain inclination being concordant with that of the initial section of the pack-guiding arcuate channel. Thus, the pack runs easily and surely into the initial section of the pack-guiding arcuate channel.

BRIEF DESCRIPTION OF THE DRAWINGS

These and other features of the invention, and the advantages arising therefrom will appear in the following specification of one preferred embodiment thereof, shown by way of a non-limiting example in the accompanying drawings, in which.

DESCRIPTION OF THE PREFERRED EMBODIMENTS

Figure 1:
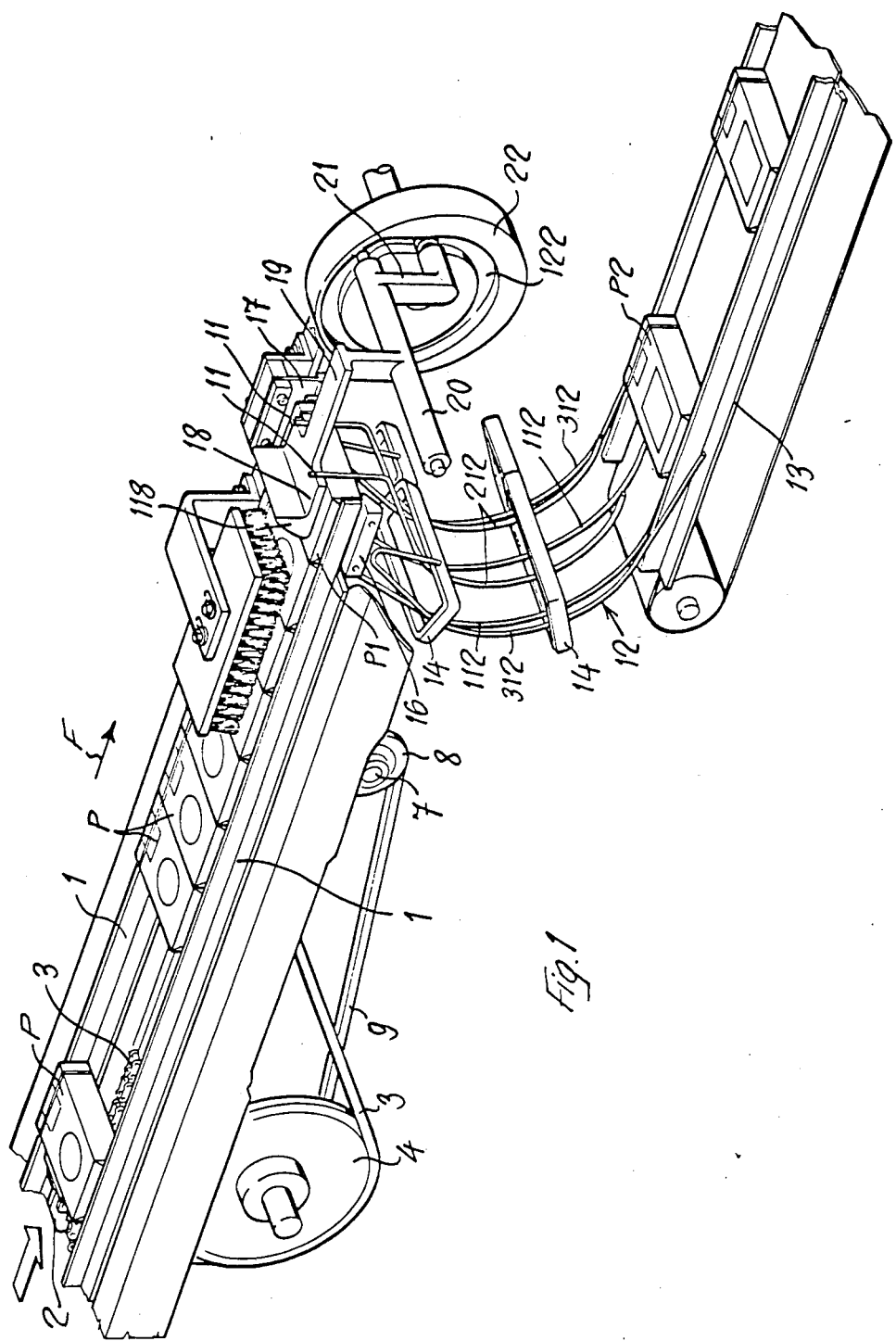
FIG. 1 is a perspective view showing an overturning device according to the invention, which is particularly designed for cigarette packs.

Referring to the figures, the shown device comprises a pair of spaced apart, substantially horizontal guides 1 on which the cigarette packs P are supported. The packs P come, for example, from a cellophane-wrapping machine, and in a first section of guides 1 these packs are advanced by the driving members 2 of an endless conveyor chain 3 which is inserted between the two guides 1 and is led over the gear wheels 4, 5 and 6. The gear wheel 4 is a driving wheel, and through the chain drive 8, 9, 10 it is driven by the driving shaft 7. Downstream of the idle gear wheel 6 of the conveyor chain 3, the packs P are collected on guides 1 in a row, into mutual contact, and are advanced on these guides in the direction F, owing to the thrust as exerted by each new pack P fed by the chain 3.

In the shown embodiment, the cigarette packs P are so oriented that they have their long sides arranged transversely to guides 1, and so they are advanced in the direction F transversely to their length. Of course, it is also possible to have the cigarette packs P oriented with their long sides in the direction of guides 1, so that they are advanced in the direction of their length.

At the end of the pair of guides 1 there is provided an abutment stop member 11. Before the abutment stop member 11, between the guides 1 there is located the opening of a pack-guiding arcuate channel 12 extending in a vertical plane at about 180° from the pair of guides 1, as far as an underlying conveyor belt 13 for the capsized packs P2. The pack-guiding arcuate channel 12 has its extrados convex side 112 turned toward the direction in which the packs P arrive on the pair of guides 1, i.e., in the opposite direction to the direction of progress F of packs P on the guides 1.

Figure 2:
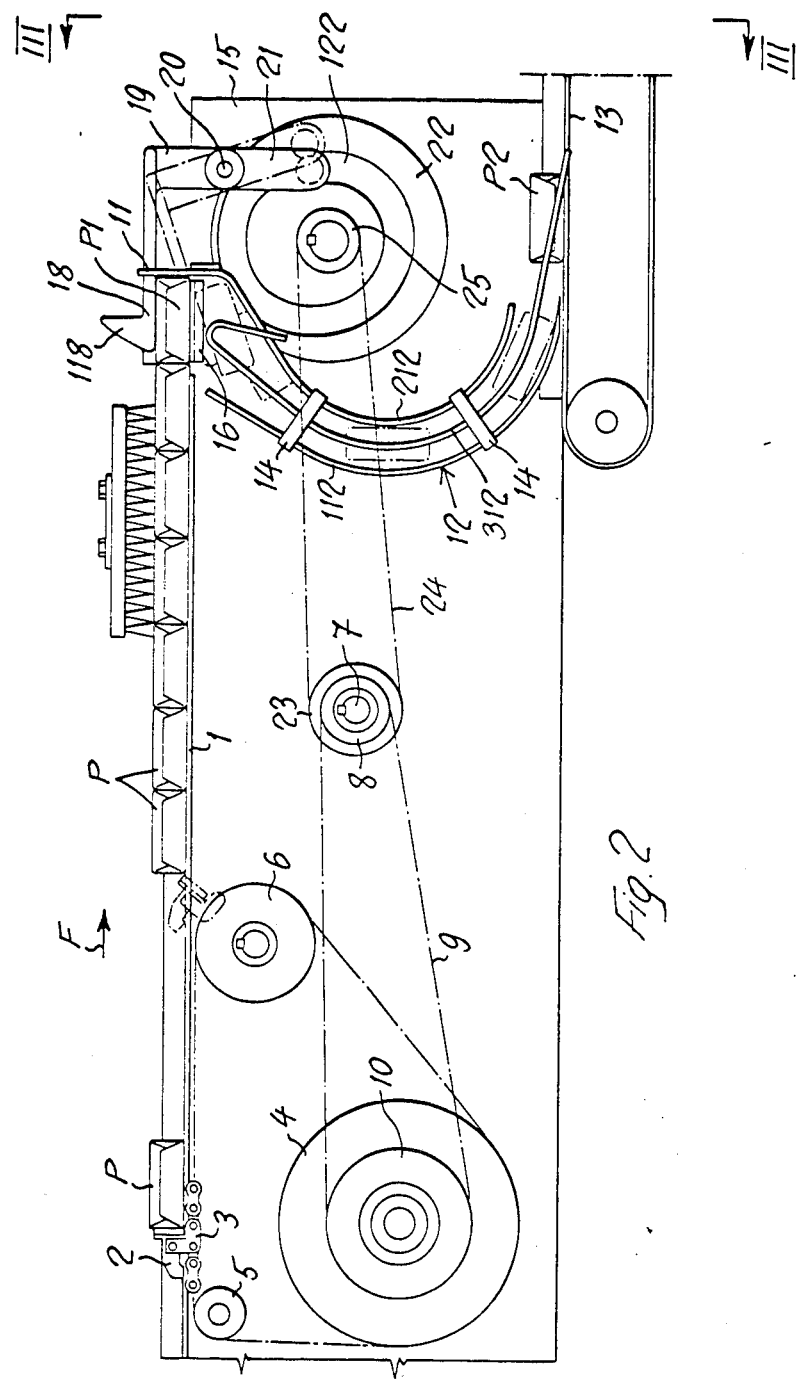
FIG. 2 is a side elevational view of said device.
Figure 3:
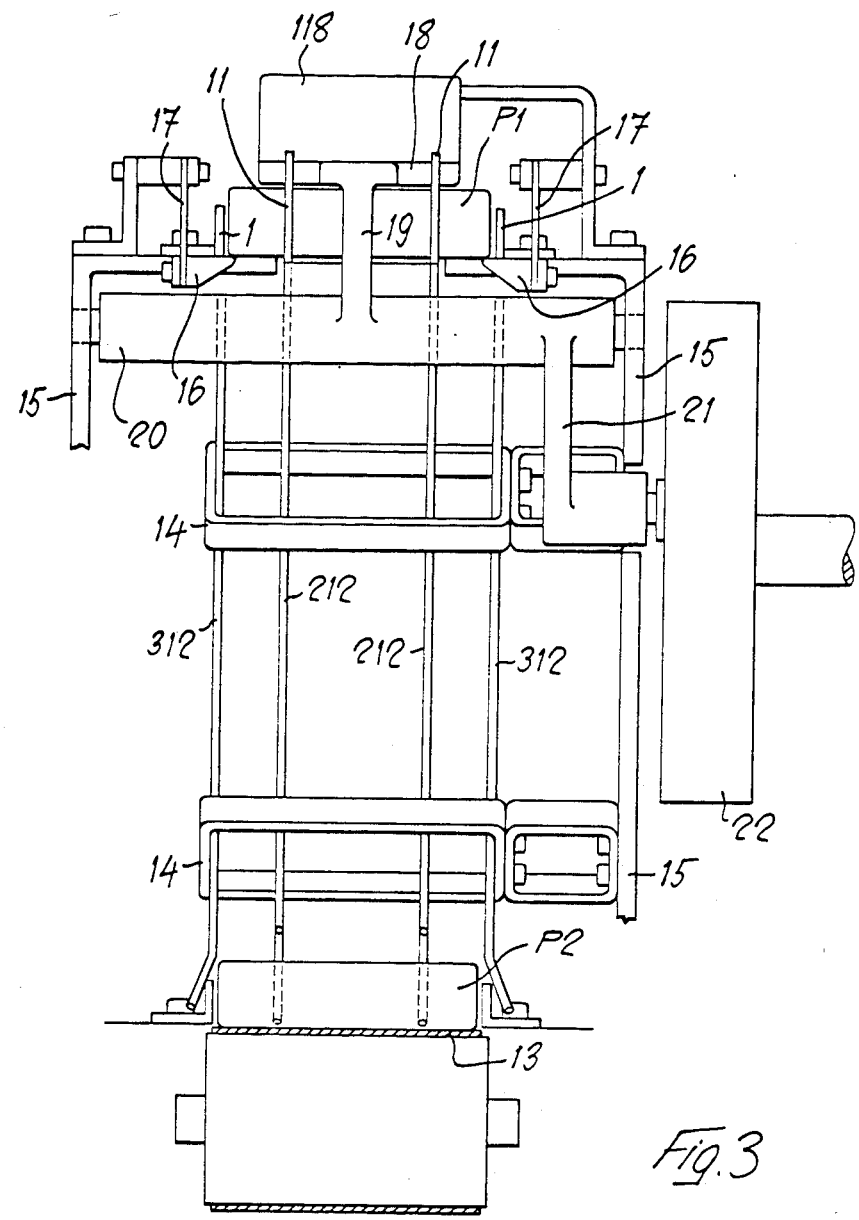
FIG. 3 is a front elevational view of said device, according to arrows III—III of FIG. 2.

The last upper section of the extrados side 112 and the intrados side 212 of the pack-guiding arcuate channel are rectilinear and diverge from each other, whereby a flared top opening of the said arcuate channel 12 is obtained, as it appears particularly in FIG. 2. The width of the flared top opening of the pack-guiding channel 12, when measured in the longitudinal direction of guides 1, is greater than the corresponding extension of a pack P, i.e., in the shown embodiment, than the width of a cigarette pack P.

The pack-guiding arcuate channel 12 preferably is cage-like in construction and is, for example, formed by metal wires. The extrados side 112 and the intrados side 212 of channel 12 are each formed by one or more wires, while on either side of channel 12 at least one wire 312 is provided for delimiting it laterally. The group of the separate wires 112, 212 and 312 is held by external wire-supporting frames 14 fastened to the frame 15 of the device. At their upper end, the wires forming the intrados concave side 212 of the pack-guiding channel 12 extend upwardly beyond the opening of said channel 12 and form the abutment stop member 11.

The pack-supporting section of guides 1 terminates at a distance from the abutment stop member 11, and this distance substantially corresponds to the respective width of the opening of the pack-guiding arcuate channel 12. In front of the abutment stop member 11, and in correspondence of the opening of the pack-guiding arcuate channel 12, the leading pack P1 in the row of packs P on guides 1 is supported only at the edges of two opposite sides thereof, which extend in the longitudinal direction of guides 1, by means of two supporting teeth 16 which are each carried by a vertical leaf spring 17 fastened to the frame 15 of the device. Over the leading pack P1 in the row of packs P a swingable pusher 18 is provided, and through a lever 19 it is secured to a shaft 20 for the swinging thereof, which extends transversely to the pair of guides 1 and is rotatably mounted, behind the abutment stop member, in the frame 15 of the device. The shaft 20 for the swinging of pusher 18 is integral with a lever 21 engaged in the groove 122 of a cam 22, which through a chain drive 23, 24, 25 is operated synchronously with the pack-feeding conveyor chain 2, for example by the same driving shaft 7.

Every time a leading pack P1 in the row of packs P that is advanced on guides 1 in the direction of arrow F, is transferred from these guides 1 onto the supporting teeth 16 over the opening of the pack-guiding arcuate channel 12, the cam 22 causes the pusher 18 to swing downwardly about its shaft 20, from the rest position shown with solid lines in FIG. 2 to the position shown with dashed lines in the same figure. The pusher 18 thus drives the leading pack P1 downwardly, and under this thrust the pack P1 opens out the two supporting teeth 16 which are elastically pivoted outward, and correspondingly deform the respective leaf springs 17. The pack P1 is then passed between the opened out supporting teeth 16, and is dropped into the underlying opening of the pack-guiding arcuate channel 12. Since the pusher 18 bears on a relatively extended surface of pack P1 and swings about a shaft 20 which is relatively far from the pack P1, it imparts the pack P1 when this pack is passing between the supporting teeth 16, a certain inclination that is concordant with the inclination of the flared opening of the pack-guiding arcuate channel 12, i.e., concordant with the inclination of the rectilinear upper section of the intrados side 212 of said channel 12, as shown by dash lines in FIG. 2. This inclination facilitates the insertion of the pack P1 into the successive curved section of the pack-guiding arcuate channel 12.

On the other hand, the pack P1 would be regularly inserted into the flared top opening of the pack-guiding arcuate channel 12 and would all the same run into the annexed curved section of the channel 12, even if it were driven by the pusher 18 so as to be translated downwardly, parallel to itself, i.e., by being kept horizontal when it is passing between the opened out pack-supporting teeth 16. In this instance, the pack P1 would at first actually bear with its end turned toward the abutment stop member, against the inclined rectilinear top section of the intrados wall 212 of the pack-guiding arcuate channel, and would straighten after inclining itself concordantly with the the inclined section, thus properly running into the arcuate section of the said pack-guiding channel 12.

The free end of the swingable pusher 18 has a snug-shaped upper projection 118 that serves as abutment stop member for the row of packs P following the leading pack P1, and supports the thrust which may be exerted by the packs P in the direction of arrow F during the lowering of pusher 18 and the transfer of the leading pack P1 into the opening of the pack-guiding arcuate channel 12.

It is also apparent that the pusher drives downwardly the leading pack P1 in the row of packs P and causes it to regularly drop into the flared opening of the pack-guiding arcuate channel 12, even in the case of an appreciably inexact positioning of the pack P1 with respect to the abutment stop member 11, i.e., even when the leading pack P1 in the row of packs P stops such that it is not in contact with the abutment stop member 11, but at a sensible distance therefrom. However, for attaining a greater reliability, any suitable sensor may be provided, which checks the position of the leading pack P1 in the row of packs P and prevents the pusher 18 from being actuated when the distance of the pack P1 from the abutment stop member 11 exceeds a predetermined value.

In any case, the pack P1 which is dropped into the pack-guiding arcuate channel 12 runs along this channel by gravity, with its side that in the row of packs P on the pair of guides 1 was turned backward, relatively to the direction of progress F of said row, being turned forward. Thus, the pack P is overturned in the course of its travel along the pack-guiding arcuate channel 12, and comes out of the lower mouth of said channel 12 in a capsized position. The overturned packs P2 received by the conveyor 13, therefore have their face that was turned downward in the row of packs P on the pair of guides 1, turned upwards.

We claim:

1. A device for overturning packs, particularly cigarette packs, or the like, which are advanced in a substantially horizontal row toward an abutment stop member, and must be each capsized around an axis which is transverse to the direction of progress of the pack row, so as to turn upward their originally downwardly turned face, characterized by a pack-guiding arcuate channel extending in a substantially vertical plane at about 180°, from a substantially horizontal top opening provided before the abutment stop member and having a width that is at least slightly greater than the extension of pack in direction of progress of the pack row, as far as an underlying conveyor for the overturned packs, which pack-guiding arcuate channel has its extrados convex side turned toward the direction of arrival of the pack row, while in correspondence of its opening, means are provided which are adapted for each time supporting in a substantially horizontal position the leading pack in the row of packs and for letting it through upon control, so as to cause it to drop into the opening of the pack-guiding channel, and the pack runs along the pack-guiding arcuate channel by gravity, with its side that in the overlying row of packs was turned backward, being turned forward; the width of the opening of the pack-guiding arcuate channel, in the direction of progress of the row of packs, is sensibly greater than the extension of a pack in the direction, so that even when the leading pack in the row of packs lies at a certain distance from the abutment stop member, this pack can be led into the pack-guiding arcuate channel; the top opening of the pack-guiding arcuate channel flares upwardly; the opening of the pack-guiding arcuate channel is delimited on the extrados and/or intrados side by a substantially rectilinear upper section of the respective walls of said pack-guiding arcuate channel; the abutment stop member is formed by a relative upper extension of the intrados wall of the pack-guiding arcuate channel; the pack-guiding arcuate channel has a cage-like construction; the leading pack in the row of packs is supported over the opening of the pack-guiding arcuate channel only at the edges of at least two opposite sides thereof, by elastic supporting means that can be elastically opened for letting through a pack under the action of a thrust exerted from above on the pack by a pusher, the path of movement of the pusher as a result of movement of a cam follower by a cam causes the pusher to move downwardly and rearwardly toward the extrados side and in such a manner that already at the time of its passage between the elastic supporting means, this pack is caused to assume a certain inclination being concordant with that of the initial section of the pack-guiding arcuate channel, or with that of the upper section of the intrados wall of said channel.

2. The overturning device according to claim 1, characterized in that the pusher acts with a relatively wide surface upon the pack, and is swingably mounted on a shaft provided at a distance beyond the abutment stop member.

3. The overturning device according to claim 2, characterized in that the pusher is synchronously operated by means of the cam, with the means causing the row of packs to be advanced toward the abutment stop member, and which includes a conveyor chain provided with driving members.

4. The overturning device according to claim 3, characterized by sensor means that prevent the pusher from being actuated when the leading pack in the row of packs stops at a distance from the abutment stop member, which exceeds a certain limit.

5. A device for overturning packs, particularly cigarette packs, or the like, which are advanced in a substantially horizontal row toward an abutment stop member, and must be each capsized around an axis which is transverse to the direction of progress of the pack row, so as to turn upward their originally downwardly turned face, characterized by a pack-guiding arcuate channel extending in a substantially vertical plane at about 180°, from a substantially horizontal top opening provided before the abutment stop member and having a width that is at least slightly greater than the extension of pack in direction of progress of the pack row, as far as an underlying conveyor for the overturned packs, which pack-guiding arcuate channel has its extrados convex side turned toward the direction of arrival of the pack row, while in correspondence of its opening, means are provided which are adapted for each time supporting in a substantially horizontal position the leading pack in the row of packs and for letting it through upon control, so as to cause it to drop into the opening of the pack-guiding channel, and the said pack runs along the pack-guiding arcuate channel by gravity, with its side that in the overlying row of packs was turned backward, being turned forward; the leading pack in the row of packs is supported over the opening of the pack-guiding arcuate channel only at the edges of at least two opposite sides thereof, by elastic supporting means that can be elastically opened for letting through a pack under the action of a thrust exerted from above on the said pack by a pusher, the path of movement of the pusher as a result of movement of a cam follower by a cam causes the pusher to move downwardly and rearwardly toward the extrados side.

6. The overturning device according to claim 5, wherein the pusher acts with a relatively wide surface upon the pack, and is swingably mounted on a shaft provided at a distance beyond the abutment stop member.

7. The overturning device according to claim 6, wherein the pusher is synchronously operated by means of the cam with the means causing the row of packs to be advanced toward the abutment stop member, and which includes a conveyor chain provided with driving members.

8. The overturning device according to claim 7, further comprising sensor means for preventing the pusher from being actuated when the leading pack in the row of packs stops at a distance from the abutment stop member, which exceeds a certain limit.

* * * * *